United States Patent [19]

Foster

[11] Patent Number: 4,940,294

[45] Date of Patent: Jul. 10, 1990

[54] HYDRAULIC ANTI-LOCK BRAKING SYSTEMS FOR VEHICLES

[75] Inventor: David Foster, West Midlands, England

[73] Assignee: Lucas Industries Public Limited Company, England

[21] Appl. No.: 351,580

[22] Filed: May 12, 1989

[30] Foreign Application Priority Data

May 21, 1988 [GB] United Kingdom ............... 8812049

[51] Int. Cl.⁵ .............................................. B60T 8/40
[52] U.S. Cl. ..................................... 303/115; 303/116; 303/119
[58] Field of Search .................... 188/181 A; 303/113, 303/114, 115, 116, 119

[56] References Cited

U.S. PATENT DOCUMENTS 4,389,076  6/1983  Ostwald .................... 303/115 X
4,395,073  7/1983  Arikawa et al. ............. 303/116

*Primary Examiner*—Duane A. Reger
*Attorney, Agent, or Firm*—Laff, Whitesel, Conte & Saret

[57] ABSTRACT

An anti-lock braking system of the dump to expansion chamber and pump to re-apply type incorporates first and second upstream and downstream valves which are interconneted and are located in a line in series. A first one-way valve is located between the pump and the brake on the downstream side of the second valve, and a second one-way valve is located in parallel with the first one-way valve in a line between the pump and the second valve. Each valve is operable independently of, or simultaneously with, the other valve in accordance with the sensed behavior of the braked wheel to achieve four modes of normal brake application, dump, automatic brake re-application, and "hold".

8 Claims, 2 Drawing Sheets

HYDRAULIC ANTI-LOCK BRAKING SYSTEMS FOR VEHICLES

This invention relates to hydraulic anti-lock braking systems for vehicles of the kind in which the supply of hydraulic fluid from a supply, suitably a master cylinder, to a brake on a wheel is modulated automatically in an anti-lock mode in accordance with the behaviour of the braked wheel by control valve means, and a pump is adapted to generate the energy necessary to re-apply the brake automatically after the pressure applied to the brake has first been released to prevent the wheel from locking by dumping brake fluid to an expansion chamber from which it is withdrawn by the pump to re-apply the brake.

In one known hydraulic anti-lock braking system of the kind set forth, for example as disclosed in EP-A-0 202 845, in an anti-lock mode a first control valve is adapted to isolate the master cylinder from the brake, and a second control valve is adapted to dump fluid from the brake to an expansion chamber. In such a system the pump, which is driven by an electric motor, is adapted to return fluid from the expansion chamber to the master cylinder, and the first valve is also used to control the rate at which the brake is re-applied.

In anti-lock braking systems of the kind set forth, in addition to the usual three modes, namely normal brake application, dump, and automatic brake re-application, it is desirable to include a "hold" feature, namely the incorporation of means adapted to prevent the pressure applied to the brake, at least on automatic brake re-application, from increasing above a given value.

According to my invention, in an hydraulic anti-lock braking system of the kind set forth for vehicles, the control valve means comprises two separate first and second upstream and downstream valve assemblies which are interconnected and are located in a line in series, and each valve assembly is operable independently of, or simultaneously with, the other valve assembly in accordance with the sensed behaviour of the braked wheel, the first valve assembly being movable between a first position in which the master cylinder communicates with the second valve assembly and the second valve assembly is isolated from the expansion chamber and a second position in which the master cylinder is isolated from the second valve assembly and the second valve assembly communicates with the expansion chamber, and the second valve assembly being movable between a first position in which the first valve assembly communicates with the brake and a second position in which the first valve assembly is isolated from the brake, a first one-way valve is located in a line between the pump and the brake on the downstream side of the second valve assembly, and a second one-way valve is located in parallel with the first one-way valve in a line between the pump and the second valve assembly.

For normal brake application both valve assemblies are in their respective first positions, and return flow to the pump from the brake is prevented by the two one-way valves.

If an anti-lock signal is emitted, the second valve assembly remains in its first position but the first valve assembly is moved into its second position to isolate the master cylinder from the brake, the fluid from which being dumped to the expansion chamber by reverse flow through both valve assemblies, and the pump being started to withdraw fluid from the expansion chamber and circulate it in a closed circuit through the first one-way valve.

When the wheel recovers, the second valve assembly moves into its second position to isolate the brake from the expansion chamber, and the first valve assembly moves into its first position so that the pressure from the master cylinder holds the second one-way valve closed and the brake is re-applied by pressure from the pump which is supplied to the brake through the first one-way valve.

At any time during an anti-lock cycle a fourth "hold" mode may be employed. If both valve assemblies are moved into their second positions, then the pressure at the brake holds the first one-way valve closed, and the pump circulates fluid from the expansion chamber in a closed circuit through the second one-way valve and the first valve assembly. This "hold" mode holds both the master cylinder pressure and the brake pressure constant indefinitely, and may be entered at any stage.

I am able, therefore, to provide the four modes of normal brake application, brake release in response to an anti-lock signals, automatic brake re-application, and "hold" by the use of two only independently and simultaneously operable valve assemblies.

The pump is preferably driven by a motor operated in sequence with operation of the control valve means, and the output from the pump is matched by a predetermined re-apply rate for a front wheel brake. This permits a smaller and cheaper motor to be used in comparison with a motor required to power a pump of the type which continually returns fluid to the master cylinder since such a pump has to work at all times against the relatively higher output pressure from the master cylinder.

Pumping the fluid back to the brake gives a good pedal feel and no movement at all is detected by the pedal when the system is in an anti-lock mode. There is no adverse effect upon the seals of the master cylinder. Also, by pumping fluid back to the brake, which acts as a stiff accumulator, noise and hydraulic shock are reduced substantially.

Conveniently, each valve assembly comprises a solenoid-controlled valve member which is normally spring urged in one direction, and urged in the opposite direction by energisation of the coil of the solenoid in response to an energising current from a control module, in turn dependant upon a signal from a speed sensor sensing the behaviour of a respective wheel.

The first valve assembly may comprise a double-acting valve in which the valve member is alternately engageable with a different one of a pair of spaced seatings in each first and second position.

The second valve assembly may comprise a valve member which is engageable with a seating in its second position, but which is spaced from that seating in its first position.

For simplicity both valve assemblies may be of similar construction.

Since the rate of automatic brake re-application is independent of the valve means, solenoids of relatively simple construction can be utilized.

The solenoids are continuously rated which implies a relatively lower current draw. This combined with a relatively low-power pump gives a very low power system.

Preferably, a third one-way valve is housed in a passage between the master cylinder and the brake and which by-passes the valve means. When the master cylinder is operated, the third one-way valve is held closed by the pressure from the master cylinder. Should the pedal of the master cylinder by released, then the pressure in the brake is released back to the reservoir of the master cylinder automatically through the third one-way valve and without that condition first being recognised by the control module to operate the solenoid-controlled valves.

Two embodiments of my invention are illustrated in the accompanying drawings in which.

Figure 1:
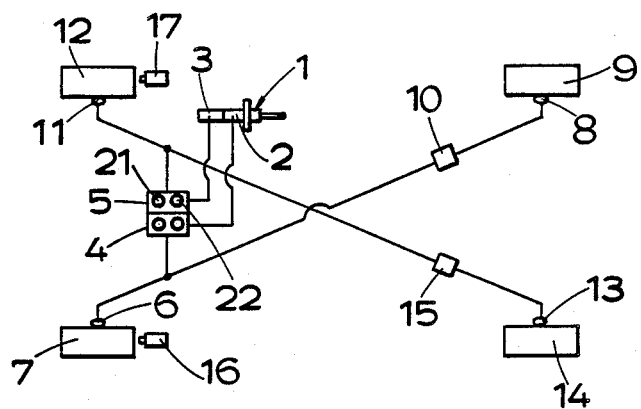
FIG. 1 is a layout of an hydraulic anti-lock braking of the two channel type including two modulators.
Figure 2:
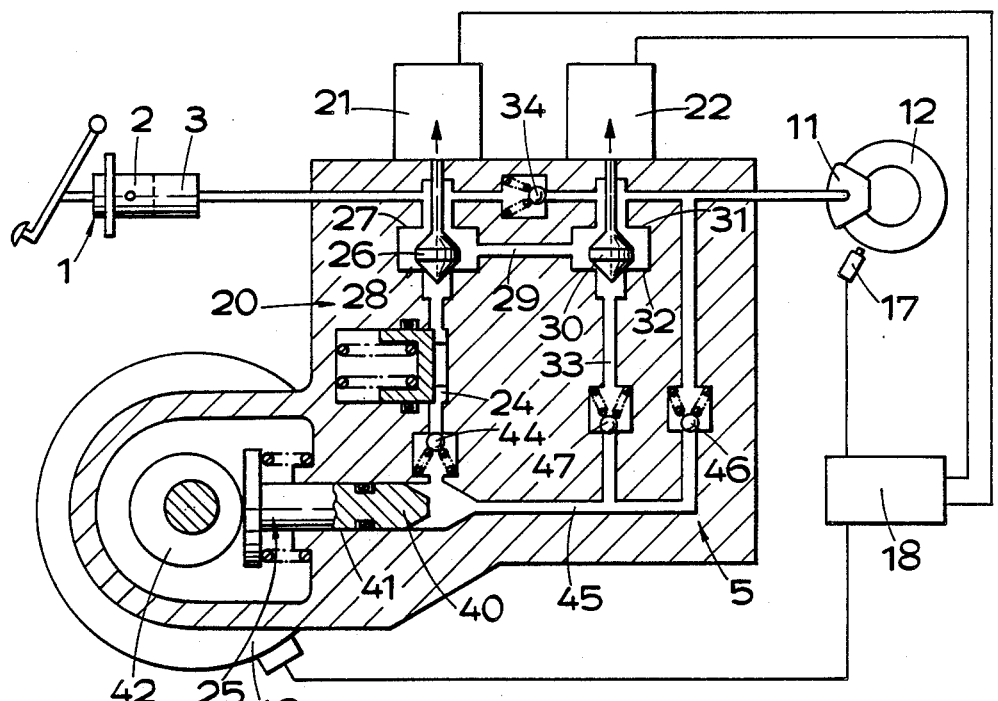
FIG. 2 is a longitudinal section through one of the modulators of FIG. 1.

The anti-lock braking system illustrated in FIGS. 1 and 2 of the accompanying drawings comprises a pedal-operated master cylinder 1 having primary and secondary pressure spaces 2, 3, each connected to a respective modulator assembly 4, 5. The modulator assembly 4 modulates the supply of fluid from the master cylinder 1 directly to a brake 6 on one front wheel 7 of the vehicle, and indirectly to a brake 8 on a diagonally opposite rear wheel 9 of the vehicle through an apportioning valve 10. Similarly the modulator assembly 5 modulates the supply of fluid from the master cylinder 1 directly to a brake 11 on the other front wheel 12 of the vehicle, and indirectly to a brake 13 on the other diagonally opposite rear wheel 14 through an apportioning valve 15.

The speed of the front wheel 7 is sensed by a speed sensor 16, and that of the front wheel 12 by a speed sensor 17. Signals from each sensor 16, 17 are fed into a control module 18 which emits electrical currents to control operation of the respective modulator assembly 4 or 5.

The modulator assemblies 4, 5 are similar in construction and the modulator assembly 5 illustrated in FIG. 2 will be described in detail. As illustrated the modulator assembly 5 comprises a housing 20 incorporating a first upstream solenoid-operated valve 21, and a second downstream solenoid-operated valve 22 interconnected in line in series with the first valve 21, an expansion chamber 24, and an hydraulic pump 25 for providing the energy to re-apply the brakes 11, 13 during an anti-lock mode.

The valve 21 comprises a double-acting valve member 26 which is alternatively engageable with one of a pair of spaced seatings 27 and 28 leading respectively from the master cylinder 1 and to the expansion chamber 24. Normally, when the solenoid is de-energised, the valve member 26 is spring-urged away from the seating 27 and into engagement with the seating 28.

The valve 22 is similar in construction to the valve 21 and comprises a double-acting valve member 30 which is alternatively engageable with one of a pair of spaced seatings 31 and 32 leading respectively to the brake 11 and from a line 33 from the pump 25. Normally, when the solenoid is de-energised, the valve member 30 is spring-urged away from the seating 31 and into engagement with the seating 32.

The two valves 21 and 22 are interconnected by a passage 29 so that when both solenoids are de-energised and the valve members 26 and 30 are spaced from the seatings 27 and 31, respectively, and unrestricted communication is provided between the master cylinder 1 and the brake 11.

A one-way valve 34 in a passage 35 which by-passes the valves 21 and 22 opens in a direction to permit return flow from the brake 11 to the master cylinder 1 when the pedal is released.

The pump 25 comprises a single piston 40 which is reciprocable in a bore 41 in response to operation of a drive mechanism 42 operated by an electric motor 43 to draw fluid from the expansion chamber 24 through a one-way valve 44 and pump it to a passage 45 leading from the bore 41. The passage 45 leads back to the brake 11 through a one-way valve 46, and back to the second solenoid-operated valve 22 through a one-way valve 47 located in the line 33 in parallel with the valve 46.

In a normal brake applying position the pump 25 is inoperative. The two solenoids are de-energised so that free communication is provided between the master cylinder 1 and the brake 11. The valve member 26 is spring urged into engagement with the seating 28 to isolate the brake 11 from the expansion chamber 24, and the valve member 30 is spring urged into engagement with the seating 32.

If the speed sensor 17 emits an anti-lock signal the control module 18 energises the coil of the solenoid of the valve 21 to urge the valve member 26 away from the seating 28 and into engagement with the seating 27. This isolates the master cylinder 1 from the brake 11, and fluid pressure in the brake is relieved to the expansion chamber 24. At the same time the control module 18 starts the motor 43 and the pump 25 operates to withdraw fluid from the expansion chamber 24 and circulate it in a closed circuit at low pressure through the one-way valve 46 and back to the brake 11, from where it returns to the expansion chamber 24.

The reduction in brake pressure will permit the wheel to recover. When this is indicated by the speed sensor 17, the control module 18 is operative to de-energise the coil of the solenoid-operated valve 21 and energise the coil of the solenoid-operated valve 22. In consequence the valve member 26 moves away from the seating 27 and into engagement with the seating 28. This isolates the brake 11 from the expansion chamber 24 and re-opens communication with the master cylinder 1. However, since the valve member 30 has, at the same time, been moved away from the seating 32 and into engagement with the seating 31, the master cylinder 1 is isolated from the brake and the pressure from the master cylinder 1 acts in a direction to hold the one-way valve 47 closed against delivery pressure now being generated by the pump 25. The pump pressure is therefore supplied to the brake 11 through the one-way valve 46 to affect automatic brake re-application.

Should a further anti-lock signal be sensed by the reservoir 17 then the sequence described above is automatically repeated.

At any time while the anti-lock system is functioning, a fourth "hold" mode may be employed. If the coils of both solenoid-operated valves 21 and 22 are then energised so that the valve members 26 and 30 are urged into engagement with the seatings 27 and 31 respectively, the brake pressure will seal off the one-way valve 46, and the pump 25 will recirculate fluid through the one-way valve 47 and the expansion chamber 24 in a closed circuit. This mode holds both the master-cylinder pressure and the brake pressure constant indefinitely since the master cylinder pressure cannot increase and the brake 11 is isolated both from the master cylinder 1 and the pump 25. This mode may be entered at any stage.

When the control module 18 is sure that the wheel 12 has fully recovered, the coils of both solenoid-operated valves 21 and 22 are de-energised to permit automatic brake re-application, and the motor 43 is turned off.

Also, if at any stage the driver removes his foot from the brake pedal, the pressure in the brake 11 is released, and the fluid is returned direct to the master cylinder 1 through the one-way valve 34. This occurs automatically without waiting for the control module 18 to recognise the fact and de-energise the coils.

Figure 3:
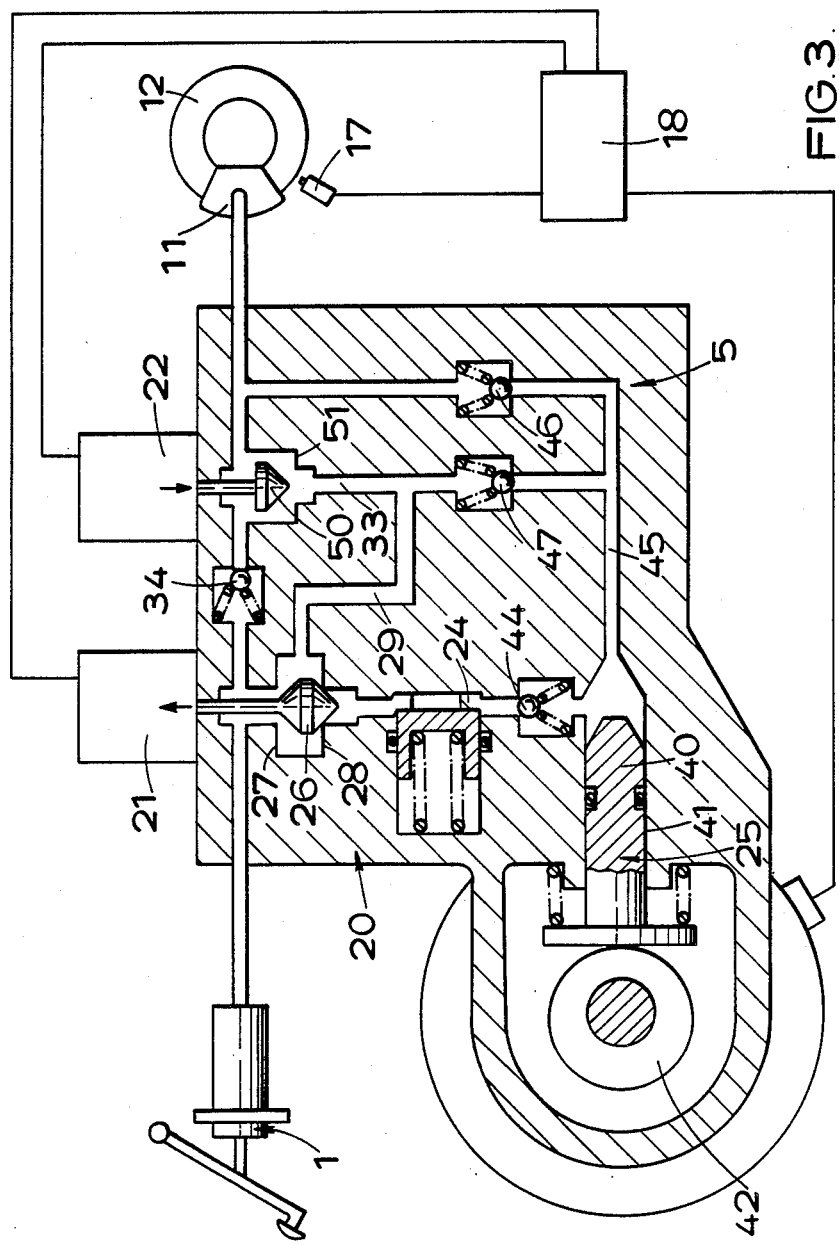
FIG. 3 is a longitudinal section similar to FIG. 2 but showing another modulator.

In the modified modulator assembly illustrated in FIG. 3 of the accompanying drawings, the valve member 30 of the solenoid-operated control valve 22 is replaced by a single acting valve member 50 which is normally spring urged away from a seating 51 disposed between the line 33 and the brake 11. The line 29 is connected to the line 33 between the seating 51 and the one-way valve 47.

When the coil of the solenoid-operated valve 22 is energised as described above, the valve member 50 is urged into engagement with the seating 51 to isolate the brake 11 from the upstream solenoid-operated valve 21 as described above.

The construction and operation of the modulator assembly of FIG. 3 are otherwise the same as that of FIG. 2 and corresponding reference numerals have been applied to corresponding parts.

I claim:

1. An hydraulic anti-lock braking system for a vehicle having a brake on a wheel, said system comprising a master cylinder for applying said brake, sensing means responsive to the behaviour of said braked wheel, control valve means for modulating in an anti-lock mode the behaviour of said braked wheel in response to signals from said sensing means, an expansion chamber to which fluid from said brake is released under control of said control valve means to prevent said wheel from locking, a pump for generating the energy necessary to re-apply said brake automatically by withdrawing previously dumped fluid from said expansion chamber, said control valve means comprising two separate first and second upstream and downstream valve assemblies, means for interconnecting said valve assemblies in a line in series, each said valve assembly being operable independently of, and simultaneously with, said other of said valve assemblies in accordance with the said sensed behaviour of said braked wheel, said first valve assembly being movable between a first position in which said master cylinder communicates with said second valve assembly and said second valve assembly is isolated from said expansion chamber and a second position in which said master cylinder is isolated from said second valve assembly and said second valve assembly communicates with said expansion chamber, and said second valve assembly being movable between a first position in which said first valve assembly communicates with said brake and a second position in which said first valve assembly is isolated from said brake, a line between said pump and said brake, a first one-way valve located in said line between said pump and said brake on the downstream side of said second valve assembly, a line between said pump and said second valve assembly, and a second one-way valve located in parallel with said first one-way valve in said line between said pump and said second valve assembly.

2. A braking system as claimed in claim 1, including a motor operated in sequence with said valve assembly, and said brake comprises a brake on a rear wheel of said vehicle, a brake also being provided on a front wheel of said vehicle, wherein said pump is driven by said motor, and the output from said pump is matched by a predetermined re-apply rate for said front wheel brake.

3. A braking system as claimed in claim 1, including a control module adapted to emit on energising current in response to signals from said sensing means, wherein each said valve assembly comprises a solenoid-controlled valve, a spring for urging said valve member in one of two opposite directions, and a coil adapted to be energised by said energising current to urge said valve member in the other of said two opposite directions.

4. A braking system as claimed in claim 1, wherein said first valve assembly comprises a pair of spaced seatings, and a double-acting valve member alternately engageable with a different one of said seatings in each of said first and second positions.

5. A braking system as claimed in claim 1, wherein said second valve assembly comprises a pair of spaced seatings, and a double-acting valve member alternately engageable with a different one of said seatings in each of said first and second positions.

6. A braking system as claimed in claim 1, wherein said second valve assembly comprises a valve seating, and a valve member adapted to co-operate with said seating, said valve member being engageable with said seating in the said second position and being spaced from said seating in the said first position.

7. A braking system as claimed in claim 3, wherein said solenoids of said first and second valve assemblies are continuously rated.

8. A braking system as claimed in claim 1, wherein a by-pass passage by-passing said valve means provides communication between said master cylinder and said brake, and a one-way valve is housed in said by-pass passage.

* * * * *